United States Patent [19]
Nishihara et al.

[11] Patent Number: 6,137,798
[45] Date of Patent: Oct. 24, 2000

[54] CONNECTIONLESS NETWORK FOR ROUTING CELLS WITH CONNECTIONLESS ADDRESS, VPI AND PACKET-IDENTIFYING VCI

[75] Inventors: Motoo Nishihara; Michio Masuda; Makoto Ogawa, all of Tokyo, Japan

[73] Assignee: NEC Corporation, Tokyo, Japan

[21] Appl. No.: 08/912,188

[22] Filed: Aug. 15, 1997

[30] Foreign Application Priority Data

Aug. 15, 1996 [JP] Japan ................................... 8-215674

[51] Int. Cl.[7] ..................................................... H04L 12/56
[52] U.S. Cl. .......................... 370/392; 370/397; 370/401; 370/474
[58] Field of Search .................................. 370/389, 392, 370/395, 396, 397, 400, 401, 409, 412, 465, 470, 471, 474

[56] References Cited

U.S. PATENT DOCUMENTS

| | | | |
|---|---|---|---|
| 5,408,469 | 4/1995 | Opher et al. | 370/397 |
| 5,420,858 | 5/1995 | Marshall et al. | 370/395 |
| 5,450,399 | 9/1995 | Sugita | 370/392 |
| 5,450,406 | 9/1995 | Esaki et al. | 370/395 |
| 5,457,681 | 10/1995 | Gaddis et al. | 370/402 |
| 5,483,526 | 1/1996 | Ben-Nun et al. | 370/399 |
| 5,490,140 | 2/1996 | Abensour et al. | 370/401 |
| 5,490,141 | 2/1996 | Lai et al. | 370/401 |
| 5,633,869 | 5/1997 | Burnett et al. | 370/396 |
| 5,638,364 | 6/1997 | Sugita | 370/397 |
| 5,815,501 | 9/1998 | Gaddis et al. | 370/402 |

FOREIGN PATENT DOCUMENTS

| | | |
|---|---|---|
| 5-260077 | 10/1993 | Japan . |
| 6-326746 | 11/1994 | Japan . |
| 8-251188 | 9/1996 | Japan . |
| 9-116551 | 5/1997 | Japan . |

*Primary Examiner*—Alpus H. Hsu
*Attorney, Agent, or Firm*—Foley & Lardner

[57] ABSTRACT

In a connectionless communication system, a number of interworking units are provided for accommodating local area networks. At the internetworking units, a packet from the local area networks are segmented into cells for transmission to an ATM network. The cells contain a connectionless address designating a designation local area network, a virtual path identifier (VPI) designating a permanent virtual connection, and a virtual channel identifier (VCI) identifying the packet. The ATM network includes a number of cross-connect nodes interconnected by communication links. The cross-connect nodes establish a plurality of permanent virtual connections between the interworking units and the nodes and between the nodes in pairs, receive the cells from the interworking units and route the cells having VCIs of the same value through the permanent virtual connections to a destination interworking unit according to the connectionless address and the VPI contained in the cells. The destination interworking unit assembles the cells having VCIs of the same value into a packet for routine the packet to the destination local area network according to the connectionless address transmitted by the packet.

20 Claims, 5 Drawing Sheets

FIG. 3
INTERWORKING UNIT

CONNECTIONLESS NETWORK FOR ROUTING CELLS WITH CONNECTIONLESS ADDRESS, VPI AND PACKET-IDENTIFYING VCI

BACKGROUND OF THE INVENTION

1. Field of the Invention

The present invention relates generally to data communication networks, and more specifically to an ATM (asynchronous transfer mode) connectionless data communication network.

2. Description of the Related Art

In an ATM network, a user packet is segmented at the entry point of the network into a plurality of 53-byte cells each having a 5-byte cell header and a 48-byte payload field. According to the ITU-T Recommendation I.363, the cells at the beginning and the end of the packet are designated as BOM (beginning of message) and EOM (end of message) cells, respectively, and those between these cells are designated as COM (continuation of message) cells. At the exit point of the network, the cells are reassembled into a packet for delivery to the destination.

In an ATM connectionless network, the user message is a single-packet message, known as a datagram. The cell header of the cells that comprise a datagram contains a destination address (DA) field into which the destination of the packet is inserted. Japanese Laid-Open Patent Specification Hei 5-260077 discloses an ATM connectionless data communication system. According to this specification, each node of the network has a DA-RDA translation table in which destination addresses are mapped to reduced destination addresses which are compressed versions of the destination addresses. When the cells of a datagram (packet) are routed from one node to the next, the DA field of each cell is used to search the DA-RDA table for a corresponding reduced destination address. The DA field of the cell is updated with this reduced destination address and the cell is routed according to its DA field. However, if a number of packets from different sources are sent to the same destination, the same destination address will be written into the DA field of the cells from these sources. If these cells exist simultaneously on a communication link of the network, the destination is incapable of discriminating the respective sources of the arriving cells and fails to reassemble them into packets according to their sources.

Therefore, the prior art technique cannot apply to ATM connectionless networks where a number of packets are likely to exist simultaneously on a communication link.

SUMMARY OF THE INVENTION

It is therefore an object of the present invention to provide an ATM connectionless data communication system that allows packets of different sources to be uniquely distinguished from each other even if they are destined for the same address.

According to a first aspect of the present invention, there is provided a data communication system for a plurality of user end systems. The communications system comprises an asynchronous transfer mode network having a plurality of connecting points at the periphery of the network. In the network, a packet from the user end systems is segmented into a plurality of cells containing a connectionless address designating one of the connecting points, a VPI designating one of a plurality of permanent virtual connections, and a virtual channel identifier (VCI) identifying the packet. The cells having VCIs of the same value are routed through a permanent virtual connection designated by the VPI contained in the cells toward a destination connecting point designated by the connectionless address contained in the cells. The VPI and VCI of the cells are rewritten when the cells are routed via a further permanent virtual connection until the destination connecting point is reached. At the destination connecting point, the cells having VCIs of the same value are reassembled into a packet and transmitted to one of the user end systems.

According to a second aspect, the present invention provides a data communication system comprising a plurality of interworking units for accommodating local area networks, the interworking units segmenting a packet received from the local area networks into a plurality of cells for transmission to an asynchronous transfer mode (ATM) network, the cells containing a connectionless address designating a destination local area network, a virtual path identifier (VPI) designating a permanent virtual connection, and a virtual channel identifier (VCI) identifying the packet. The ATM network comprises a plurality of cross-connect nodes interconnected by communication links. The cross-connect nodes establish a plurality of permanent virtual connections between the interworking units and the nodes and between the nodes in pairs, receive the cells from the interworking units and route the cells having VCIs of the same value through the permanent virtual connections to a destination interworking unit according to the connectionless address and the VPI contained in the cells. The destination interworking unit assembles the cells having VCIs of the same value into a packet for routing the packet to the destination local area network according to the connection address transmitted by the packet.

BRIEF DESCRIPTION OF THE DRAWINGS

The present invention will be described in further detail with reference to the accompanying drawings, in which.

DETAILED DESCRIPTION

Figure 1:
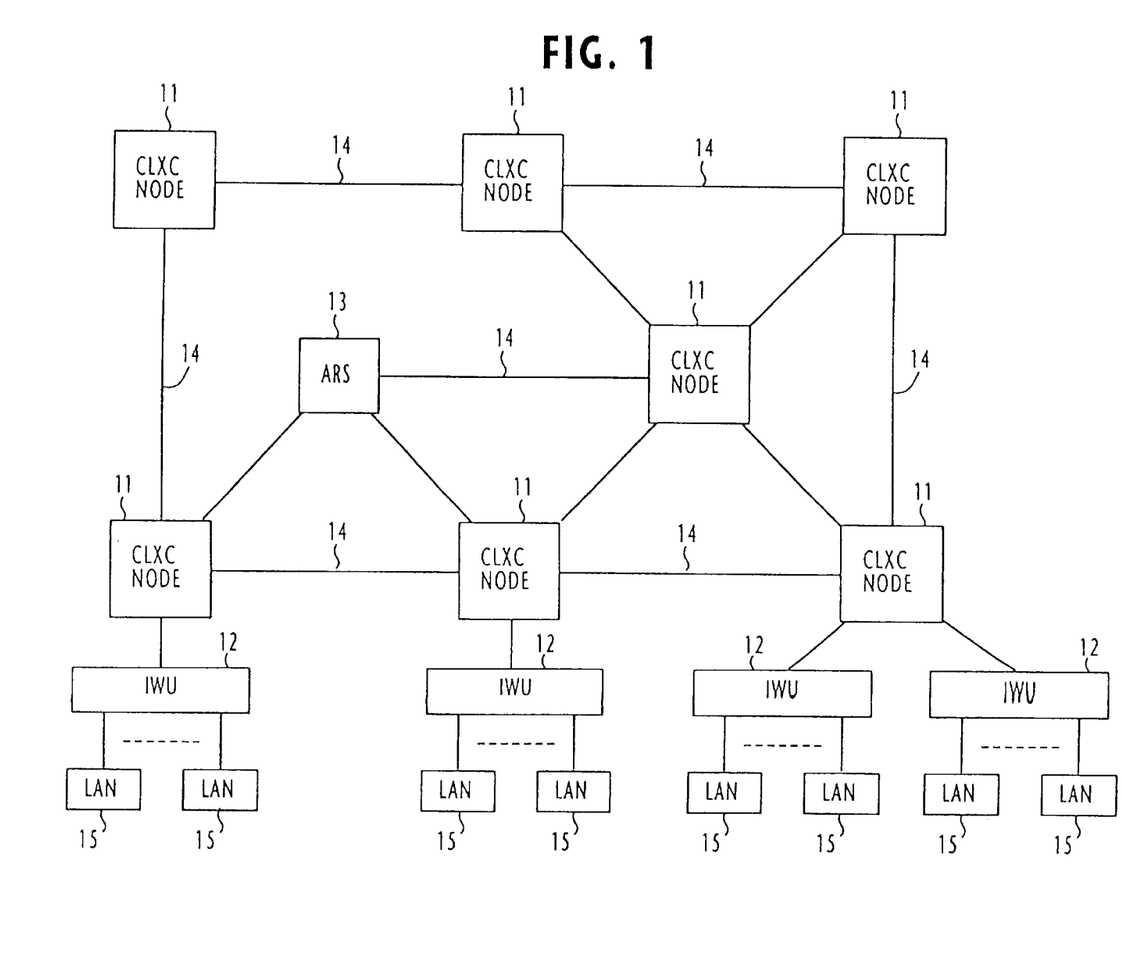
FIG. 1 is a block diagram of an ATM connectionless data communication network embodying the present invention.

Referring now to FIG. 1, there is shown an ATM (asynchronous transfer mode) connectionless data communication network according to the present invention. The network comprises a plurality of connectionless cross-connect (CLXC) nodes 11 and an address resolution server 13, all of which are interconnected by communication links 14. User end systems such as local area networks (LANs) 15 are connected to the network via interworking units 12 which perform translation between LAN's packets (i.e., Ethernet packets) and network's ATM cells. All point-to-point connections between source and destination nodes 11, between interworking units 12 and network nodes 11 and between interworking units 12 and the address resolution server 13, are established as virtual paths, or permanent virtual connections (PVC). The connecting point between each LAN and the associated interworking unit is identified by a unique connectionless address. In the address resolution server 13 holds a table in which IP addresses of all LAN's hosts and connectionless addresses of all interworking units are mapped. If a source interworking unit is not aware of the connectionless address of a destination interworking unit, it will send a request to the address resolution server 13 to obtain the connectionless address of the destination unit. The connectionless network may also be implemented with existing ATM cross-connect systems and ATM self-routine switches.

Figure 2:
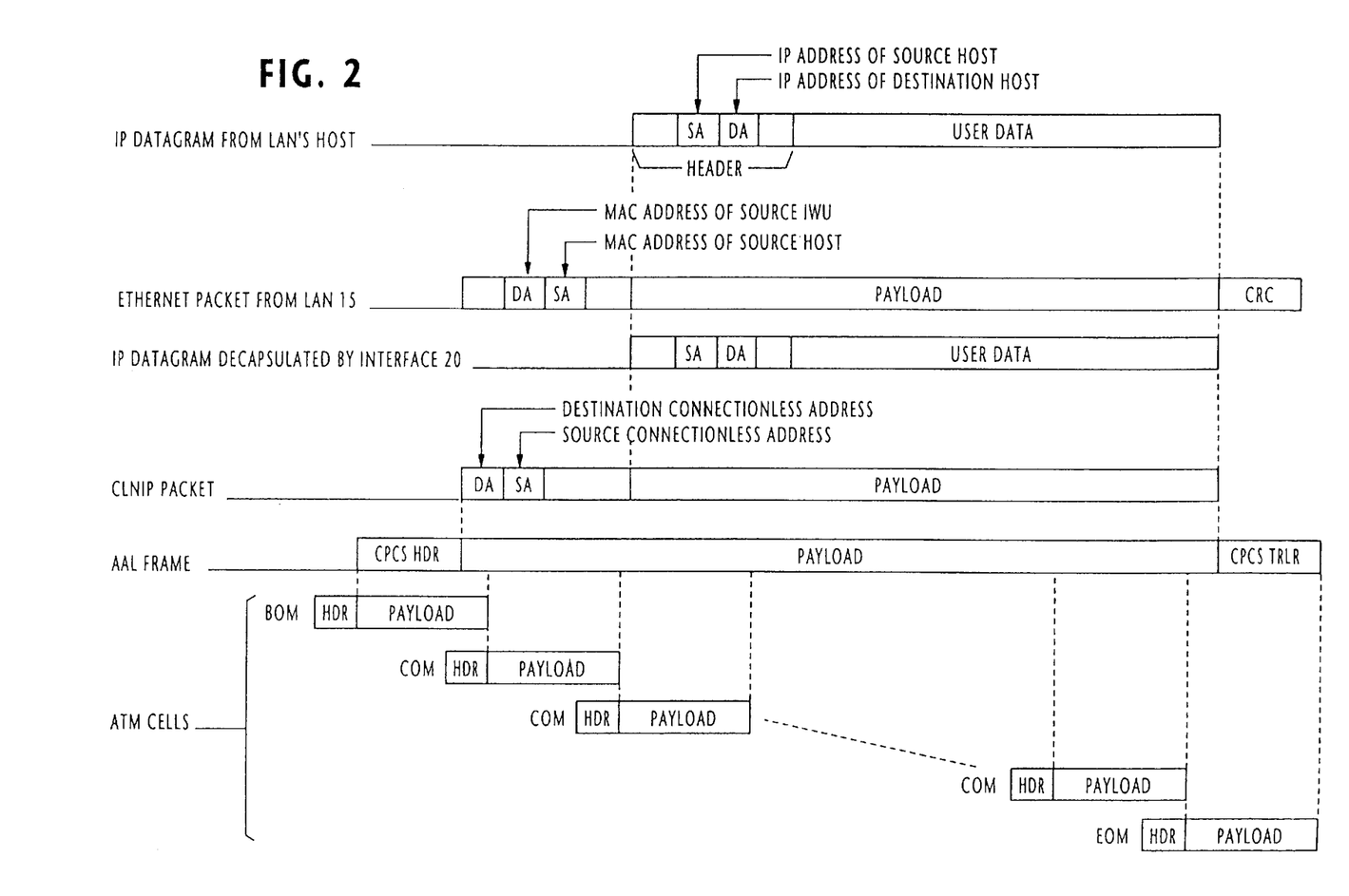
FIG. 2 is a diagrammatic view of the signal formats used in the present invention.

As shown in FIG. 2, when a host of a LAN sends a connectionless data, a destination host outside of the LAN, the data will be a single-message packet such as an IP datagram containing a source IP address (SA) and a destination IP address (DA) followed by a user data field. If the shortest distance to the destination is via the connectionless cross-connect network, the IP datagram is encapsulated between a header and a trailer (frame check sequence) and forwarded from the LAN as an Ethernet packet to the associated interworking unit. The Ethernet packet header contains the MAC (medium access control sublayer) address of the source interworking unit in the destination address (DA) field and the MAC address of the source host in the source address (SA) field. In the specification, the term "packet" is used throughout to designate user's connectionless data.

Figure 3:
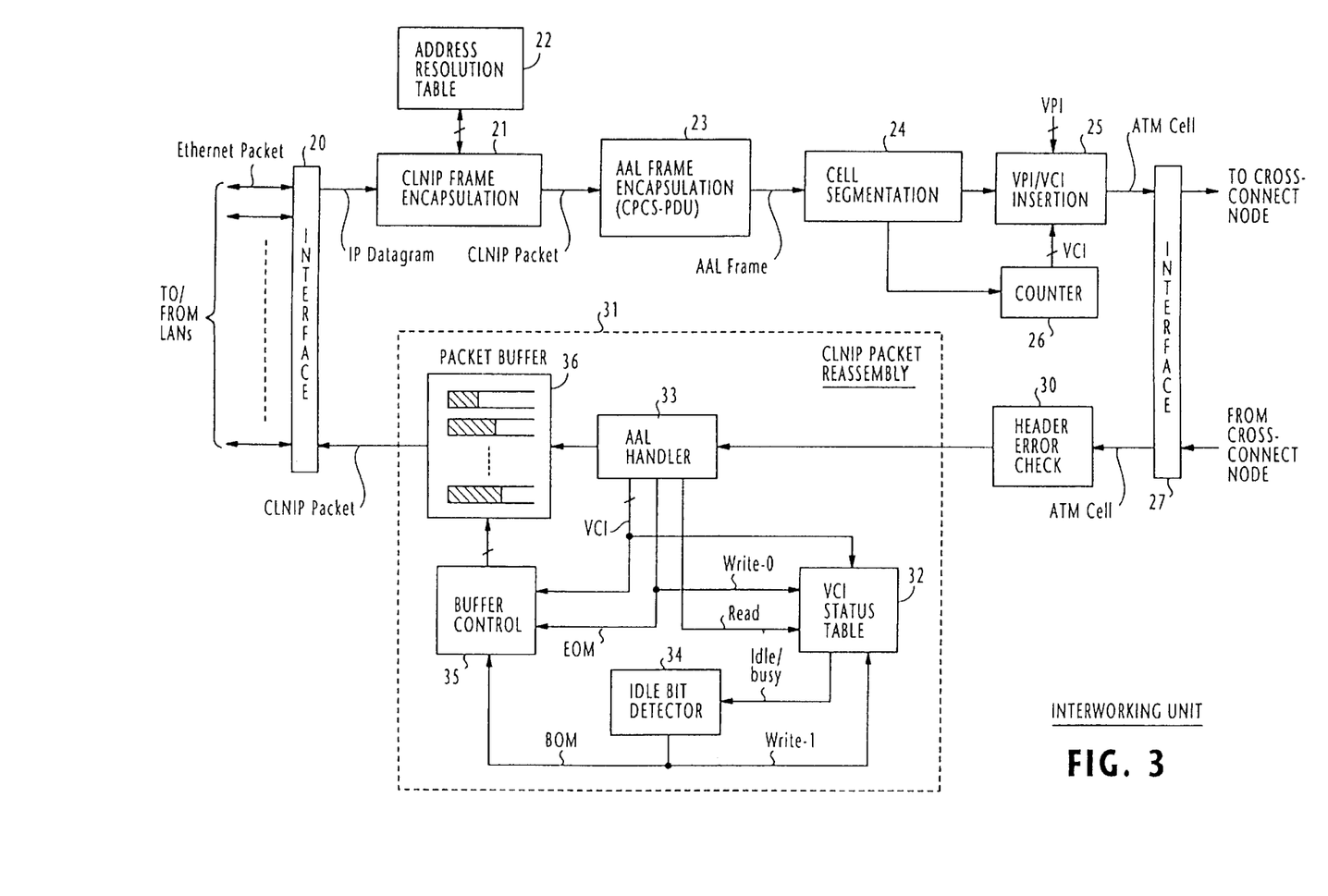
FIG. 3 is a block diagram of an interworking unit according to the present invention.

As illustrated in FIG. 3, each interworking unit 12 has a LAN interface unit 20 where an Ethernet packet from the associated LAN is decapsulated and an original IP datagram (see also FIG. 2) is extracted and supplied to a CLNIP (connectionless network interface protocol) packet encapsulation circuit 21. Encapsulation circuit 21 looks up the SA field of the IP datagram and determines from which LAN it has received the packet and inserts the connectionless address of the interworking unit into the source address (SA) field of a CLNIP packet header (FIG. 2).

An address resolution table 22 is provided in the interworking unit, where IP addresses have been mapped to connectionless addresses of the network, using an address resolution protocol. Packet encapsulation circuit 21 then uses the DA field of the IP datagram as an address pointer to search through the address resolution table 22 for a corresponding destination connectionless address that identifies the connecting point between the destination interworking unit and the destination LAN. If the destination connectionless address is found in the address resolution table 22, it is inserted into the DA field of the CLNIP packet header. Otherwise, encapsulation circuit 21 will create a request packet and forward it to the address resolution server 13 as described above to obtain the destination connectionless address and updates the address resolution table 22. The decapsulated IP datagram is then inserted into the data (payload) field of the CLNIP packet and forwarded from encapsulation circuit 21 to an AAL (ATM adaptation layer) frame encapsulation circuit 23 for conversion to an AAL frame.

The AAL encapsulation circuit 23 encapsulates the CLNIP packet between a CPCS (common part convergence sublayer) header and a CPCS trailer of the AAL layer to form a CPCS-PDU (protocol data unit) packet and presents to a cell segmentation circuit 24 for segmentation into ATM cells. Note that, in the case of AAL layer 5, no header is appended to the packet. The header of each ATM cell has a segment type (ST) field and a payload type (PT) field. If the AAL layer is an AAL-3 or AAL-4 layer, the segment type field is used to establish the identity of a cell, indicating whether it is a BOM (beginning-of-message) cell, a COM (continuation-of-message) cell, or an EOM (end-of-message) cell. If the AAL layer is an AAL-5 layer, it is only the EOM cell that is identified by the payload type (PT) field of the cell header. There are no explicit fields to identify the BOM and COM cells in the case of the AAL-5 layer. All ATM cells that comprise a single AAL frame are consistently assigned a virtual channel identifier (VCI) of the same bit pattern. A virtual path identifier (VPI) is assigned to the permanent virtual connection between the interworking unit and the associated CLXC node. This VPI is also assigned at the interworking unit to the ATM cells destined for the same connectionless address. The assigned VPI and VCI are inserted into the VPI/VCI field of the cell header by a VPI/VCI insertion circuit 25.

According to one embodiment of the present invention, VCIs are generated by a counter 26 connected to the segmentation circuit 24. Counter 26 produces a binary count value in response to an output of the segmentation circuit 24 indicating the beginning of a message (either CLNIP packet or AAL frame) and supplies this count value to the VPI/VCI insertion circuit 25 as a VCI for all the cells of a packet. Since this count value is incremented only at the beginning of a packet, the cells of each packet can be distinguished from those of other packets. The output of the VPI/VCI insertion circuit 25 is then forwarded through an interface 27 to the associated cross-connect node and propagated through the network with no possibility that the integrity of cell sequence within the same packet will be lost.

Figures 4, 5:
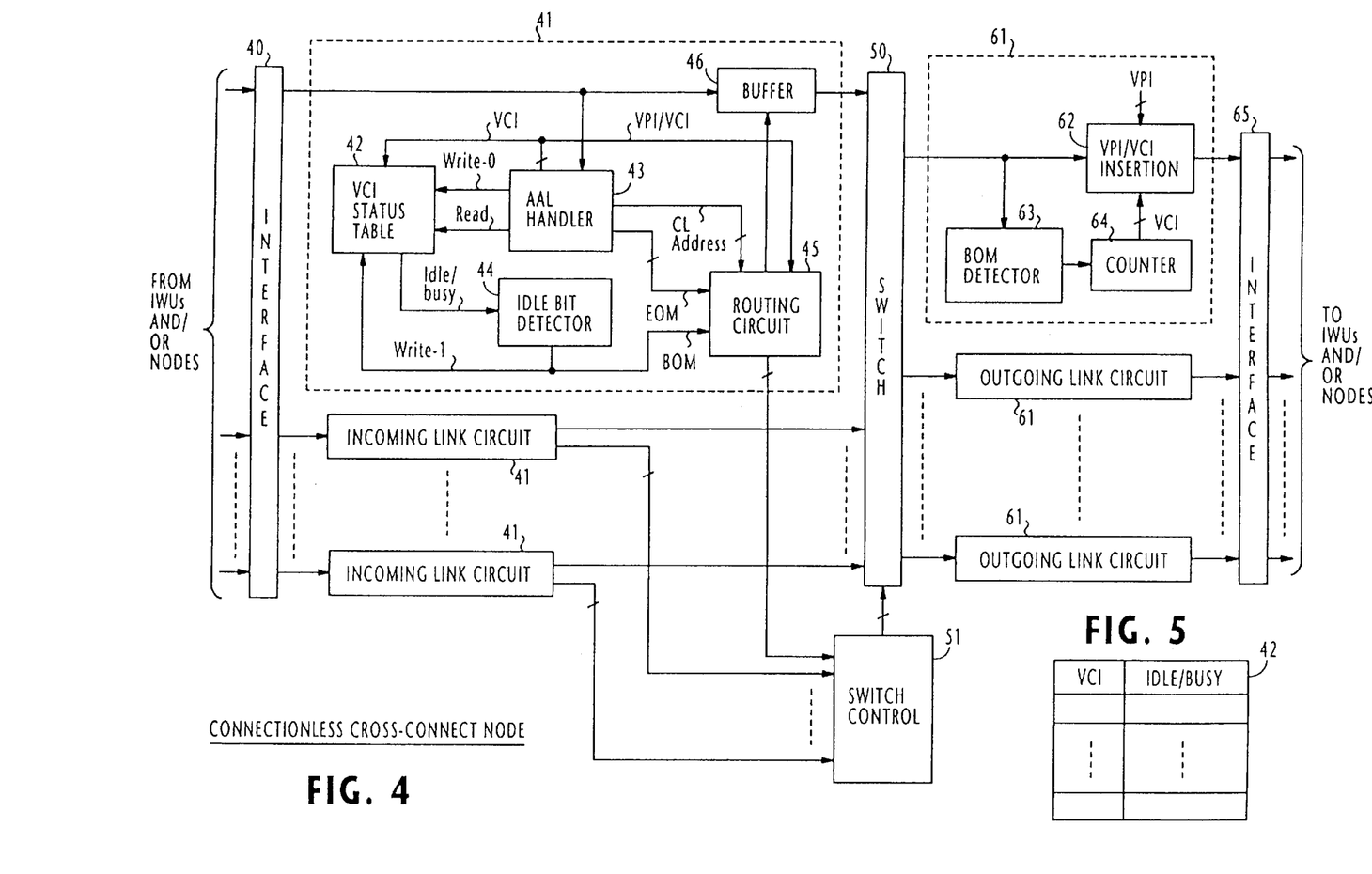
FIG. 4 is a block diagram of a connectionless cross-connect node of the present invention.
FIG. 5 is an illustration of the VCI status table of FIG. 4.

As shown in FIG. 4, each connectionless cross-connect node of the network comprises a plurality of incoming link circuits 41 connected to incoming links through an interface 40, a plurality of outgoing link circuits 61 connected to outgoing links through an interface 65, and a switch 50 connected between the incoming link circuits 41 and the outgoing link circuits 61.

ATM cells arriving from the associated interworking unit or from other cross-connect nodes are applied to one of the incoming link circuits 41. The incoming cells are also applied to an AAL handler 43 and a buffer 47. AAL handler 43 monitors each SAR-PDU header to detect its VCI and monitors the ST (segment type) field if AAL layer 3/4 is used or the PT (payload type) field if AAL layer 5 is used to determine the relative position of each ATM cell. AAL handler 43 produces a write-0 command signal when an EOM cell is detected. This write-0 command signal is applied to a VCI status table 42 in which busy/idle states of all VCIs are stored in locations addressable by the detected VCI as clearly shown in FIG. 5. The busy/idle states of each VCI are represented respectively by binary 1 indicating that the VCI is being used for the cells of a particular AAL frame and binary 0 indicating that the VCI is idle.

The application of the write-0 command signal to the table 42 causes a binary 0 to be written into a storage location identified by the detected VCI so that the VCI in that location is marked as being idle. When the AAL handler 43 detects a cell other than EOM, it supplies a read command signal to the VCI status table 42 to read the busy/idle status of a storage location specified by the detected VCI. An idle bit detector 44 is connected to the VCI status table 42 to determine whether the content of the VCI-specified location of table 42 is an idle bit. If an idle status bit is stored in the VCI-specified location, idle bit detector 44 recognizes that the currently received cell is a BOM cell and applies a write-1 command signal to the VCI status table 42 to mark the VCI-specified location as busy, or assigned.

The output of the idle bit detector 44 is also applied to a routing circuit 45 as a beginning-of-message indication. If the VCI-specific location is indicated as being assigned, the idle bit detector 44 recognizes that the currently received cell is a COM (continuation-of-message) cell and produces no output signal.

AAL handler 43 assembles ATM cells into a CLNIP packet and extracts the connectionless address from the DA field of the packet and supplies it to the routing circuit 45. Routing circuit 45 produces a routing signal according to the connectionless address and the VCI from AAL handler 43 when a BOM indication is given from the idle bit detector 44. The routing signal for cells of each CLNIP packet is retained until the AAL handler 43 detects the EOM cell of the packet.

The routing signal from each incoming link circuit 41 is supplied to a switch controller 51 which controls the switch 50 to establish a connection between the incoming link circuit and one of the outgoing link circuits 61.

If a frame header comprises a number of cells, AAL handler 43 control the buffer 46 so that, when the BOM cell of the header is stored in buffer 46, it is held in queue only for a duration corresponding to that number of cells. That is, the BOM cell only has to wait for the arrival of the COM cell that defines the end of the header. When these header cells are stored in buffer 46, the routing circuit 45 is informed by AAL handler 43 of the destination connectionless address of the frame and its VPI and VCI values and produces and holds a routing signal of the frame until it is informed of the detection of an EOM cell having the same VCI value. Therefore, the amount of memory required to implement the buffer 46 is determined by the maximum length of the frame header.

Each outgoing link circuit 61 comprises a VPI/VCI insertion circuit 62, a BOM detector 63 and a counter 64. Counter 64 is incremented by the output of BOM detector 63 when it detects the beginning of a message (packet) and supplies this count value as a new VCI to be assigned to all cells of the same packet supplied from the switch 50. The VPI, which is assigned to the permanent virtual connection between the current node and a destination node, is also assigned to these cells as a new VPI. The VPI/VCI field in the header of each cell is updated with the newly assigned VPI and VCI values in the VPI/VCI insertion circuit 62 and forwarded to an outgoing link through an interface 65.

It is seen that the VCI field of each cell is updated when it is forwarded from one node to the next.

Reverting to FIG. 3, ATM cells arriving from the associated cross-connect node at a destination interworking unit are coupled through interface 27 to a header error check circuit 30. If no error is detected in the cell headers, the incoming ATM cells are supplied to a CLNIP packet reassembly circuit 31. The ATM cells from the error check circuit are also applied to an AAL handler 33.

AAL handler 33 monitors each ATM cell and detects the VCI of the cell. AAL handler 33 further monitors the ST (segment type) field of each SAR-PDU header if AAL layer 3/4 is used or the PT (payload type) field of each cell if AAL layer 5 is used and produces a write-0 command signal when an EOM cell is detected. This write-0 command signal is applied to a VCI status table 32 which is similar to that shown in FIG. 5 in which the busy/idle states of VCIs are stored in locations addressable by the VCI of the received cell detected by the handler 33.

The busy/idle states of each VCI are represented respectively by binary 1 and binary 0. The application of the write-0 command to the table 32 causes a binary 0 to be written into a storage location of the table 32 specified by the detected VCI so that the VCI in this location is marked as being idle. When the AAL handler 33 detects is cell other than EOM, it supplies a read command signal to the VCI status table 32 to read the busy/idle status of a storage location specified by the detected VCI. An idle bit detector 34 is connected to the VCI status table 32 to determine whether the content of the VCI-specified location of table 32 is an idle bit. If an idle status bit is stored in the VCI-specified location, idle bit detector 34 recognizes that the currently received cell is a BOM cell and applies a write-1 command signal to the VCI status table 32 to mark the VCI-specified location as busy. The output of the idle bit detector 34 is also applied to a buffer controller 35 as a beginning-of-message indication. If a busy indication bit is stored in the VCI-specified location, the idle bit detector 34 recognizes that the currently received cell is a COM cell and produces no output signal. After receiving each ATM cell, the AAL handler 33 removes the header of the cell and forwards the 48-byte payload of the cell to a packet buffer 36.

Buffer controller 35 produces an address code indicating CLNIP packet and its storage location within buffer 36 by using the VCI detected by the AAL handler 33 and the BOM indication. Therefore, all ATM cells from the connectionless network are stored in queues respectively corresponding to packets. When the AAL handler 33 detects the EOM cell in a CLNIP packet, buffer controller 35 is informed of this fact and knows that this packet has been reassembled in buffer 36 and forwards it to interface 20.

Interface 20 removes the header and trailer of the CLNIP packet and converts the IP datagram in the payload field of the packet to an Ethernet packet and forwards it to one of the user LANs through a port identified by the destination connectionless address contained in the removed CLNIP packet header.

Since the counter 26 of the interworking unit and the counter 64 of the node produce a VCI as a sequence number, there is a possibility that the same VCI is used simultaneously by two packets if the previous packet is held in a long queue prior to transmission. The VCI value of each packet is unique to each link on which it is propagated. Therefore, on each link cells of each packet can be uniquely identified by their VCI. However, since the number of VCIs that can be used for a link is related to its transmission capacity, the likelihood of such possibility increases with an increase in traffic. While the use of a counter for producing VCIs is favorable because of its simple and yet low-cost implementation, it is not suitable for applications where efficient utilization of VCIs is desired for increased traffic.

Figure 6:
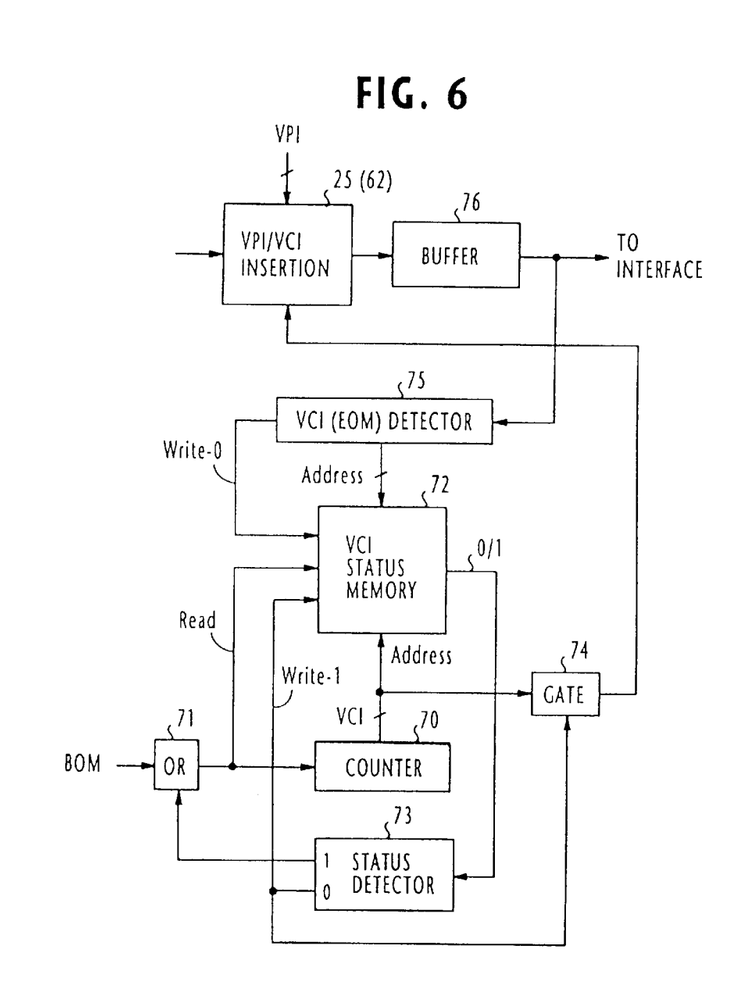
FIG. 6 is a block diagram of a modified VCI generator.

FIG. 6 illustrates a VCI generator capable of efficient utilization of VCIs. In this modification, a BOM (beginning of message) indication is supplied to a binary counter 70 via an OR gate 71 to increment its count and further to a VCI status memory 72 as a read command signal. The output of counter 70 is supplied as an address pointer to the memory 72 for reading the idle/busy status bit of a location of the memory specified by the address pointer. The output of memory 72 is checked by a status detector 73, which supplied a write-1 command signal to the memory if the status bit is "0" (idle) and supplies a read command signal to the memory and an increment command to the counter via OR gate 71 if the status bit is "1" (busy). As long as the status bit of a storage location is "1", the search for an idle VCI is continued by successively reading other locations of the memory and checking their contents by status detector 73. If the status bit of a location is "0", a gate 74 is activated to pass the output of counter 70 to the VPI/VCI insertion circuit 25 (62) as an assigned VIC and a "0" is written into this location. A buffer 75 is connected to the output of VPI/VCI insertion circuit 25 (62) for absorbing cells waiting for transmission to the link. A VCI detector 76, connected to the output of buffer 75, monitors the cells delivered to the link for detecting the VCI of an EOM cell. When the VCI of an EOM cell is forwarded from buffer 75, the detector 72 detects and uses this VCI as an address pointer for accessing the VCI status memory 72 and supplies a write-0 command signal to the memory to change the status this VCI to "0".

Figure 7:
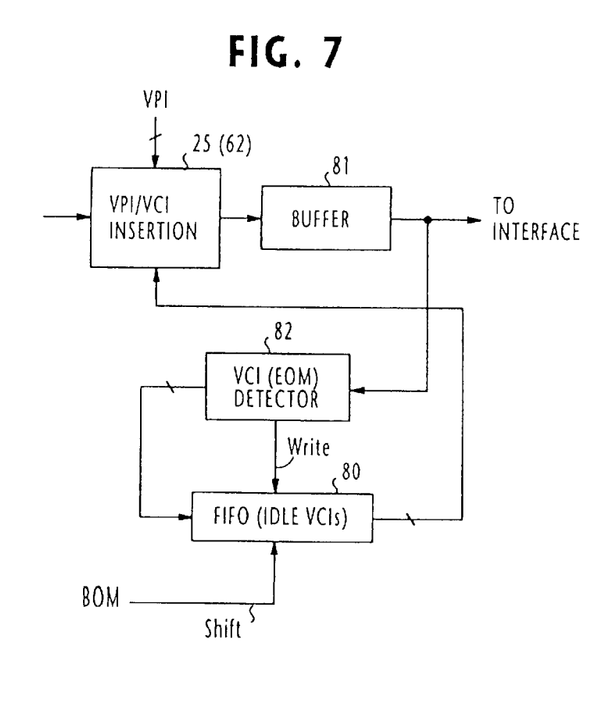
FIG. 7 is a block diagram of another modification of the VCI generator.

Another modification of the VCI generator, illustrated in FIG. 7, has a first-in-first-out (FIFO) memory 80 in which a plurality of VCI values are initially stored as idle VCIs. A buffer 81, connected to the output of VPI/VCI insertion circuit 25 (62), absorbs ATM cells waiting for transmission. A VCI detector 82 monitors the output of buffer 82 for detecting the VCI of an EOM cell. Upon detecting the VCI of an EOM cell, the detector 82 returns this VCI to the FIFO memory 80 by applying to it a write command signal.

What is claimed is:

1. A data communication system comprising:

a plurality of interworking units for accommodating local area networks, said interworking units segmenting a packet received from said local area networks into a plurality of cells for transmission to an asynchronous transfer mode (ATM) network, said cells containing a connectionless address designating one of said local area networks, a virtual path identifier (VPI) designating a permanent virtual connection, and a virtual channel identifier (VCI) identifying said packet; and the ATM network comprising a plurality of cross-connect nodes interconnected by communication links, said cross-connect nodes establishing a plurality of said permanent virtual connections between said interworking units and said nodes and between said nodes in pairs, receiving the cells from the interworking units and routing the cells having VCIs of equal value through the permanent virtual connections to said one of the interworking units according to the connectionless address and the VPI contained in the cells, said one of the interworking units assembling the cells having VCIs of equal value into a packet and routing the packet to said one of the local area networks according to the connectionless address transmitted by the packet.

2. A data communication system as claimed in claim 1, wherein each of said interworking units comprises:

a counter for incrementing a count value in response to one of said cells that define the beginning of a packet; and means for writing said count value into a VCI field of each of said cells that comprise said packet.

3. A data communication system as claimed in claim 1, wherein each of said interworking units comprises:

a VCI status memory for storing a status indication of each of a plurality of VCIs in a plurality of storage locations;

a counter for incrementing a count value in response to one of said cells that defines the beginning of a packet and reading the status indication of one of said VCIs using the count value as an address pointer;

a VCI insertion circuit for inserting a VCI into a VCI field of each of said cells;

means for writing a busy indication into said one of the locations and causing said VCI insertion circuit to insert said count value into said VCI field if the read status indication is an idle indication;

a buffer connected to the output of the VCI insertion circuit for storing a sequence of cells in a queue and forwarding the cells to one of the cross-connect nodes; and means for writing an idle indication into said one of the locations of response to one of the cells from said buffer which corresponds to the end of said packet.

4. A data communication system as claimed in claim 1, wherein each of said interworking units comprises:

a VCI insertion circuit for inserting a VCI into a VCI field of each of said cells;

a first-in-first-out (FIFO) memory for storing a plurality of idle VCIs, the FIFO memory being responsive to one of said cells that defines the beginning of a packet for forwarding one of the stored VCIs to said VCI insertion circuit to insert the forwarded VCI into said VCI field;

a buffer connected to the output of the VCI insertion circuit for storing a sequence of cells in a queue and forwarding the cells to one of the cross-connect nodes; and means for detecting the VCI of a cell forwarded from said buffer at the end of said packet and storing the detected VCI into the FIFO memory.

5. A data communication system as claimed in claim 1, wherein each of said interworking units comprises:

a VCI status table for storing a status indication of each of a plurality of VCIs in a plurality of storage locations;

means for detecting the VCI contained in each of the cells received from the ATM network, reading a status indication from one of said locations of the table corresponding to the detected VCI, writing a busy indication into said one of the locations and recognizing a cell from the ATM network as the beginning of a packet if the read status indication is an idle indication, and writing an idle indication into said one of the locations in response to a cell from the ATM network corresponding to the end of said packet;

a buffer; and means for storing the cells from the ATM network into said buffer so that the cells having VCIs of equal value are assembled in a queue.

6. A data communication system as claimed in claim 1, wherein each of said cross-connect nodes comprises:

a counter for incrementing a count value in response to one of said cells that defines the beginning of a packet; and means for inserting said count value into a VCI field of each of said cells that comprise said packet.

7. A data communication system as claimed in claim 1, wherein each of said cross-connect nodes comprises:

a VCI status memory for storing a status indication of each of a plurality of VCIs in a plurality of storage locations;

a counter for incrementing a count value in response to one of said cells that defines the beginning of a packet and reading the status indication of one of said VCIs using the count value as an address pointer;

a VCI insertion circuit for inserting a VCI into a VCI field of each of said cells;

means for writing a busy indication into said one of the locations and causing said VCI insertion circuit to insert said count value into said VCI field if the read status indication is an idle indication;

a buffer connected to the output of the VCI insertion circuit for storing a sequence of cells in a queue and forwarding the cells to a communication link; and means for writing an idle indication into said one of the locations of response to one of the cells from said buffer which corresponds to the end of said packet.

8. A data communication system as claimed in claim 1, wherein each of said cross-connect nodes comprises:

a VCI insertion circuit for inserting a VCI into a VCI field of each of said cells;

a first-in-first-out (FIFO) memory for storing a plurality of idle VCIs, the FIFO memory being responsive to one of said cells that defines the beginning of a packet for forwarding one of the stored VCIs to said VCI insertion circuit to insert the forwarded VCI into said VCI field;

a buffer connected to the output of the VCI insertion circuit for storing a sequence of cells in a queue and forwarding the cells to one of the cross-connect nodes or one of said interworking units; and means for detecting the VCI of a cell forwarded from said buffer at the end of said packet and storing the detected VCI into the FIFO memory.

9. A data communication system as claimed in claim 1, wherein each of said cross-connect nodes comprises:

a VCI status memory for storing a status indication of each of a plurality of VCIs in a plurality of storage locations;

means for detecting the VCI contained in each of the cells received via one of said links, reading a status indication from one of said locations of the table corresponding to the detected VCI, writing a busy indication into said one of the locations and recognizing a cell from the ATM network as the beginning of said packet if the read status indication is an idle indication, and writing an idle indication into said one of the locations in response to a cell received via said one of said permanent virtual connections corresponding to the end of said packet;

a buffer for storing cells received via said one of said permanent virtual connections;

a switch; and means for controlling said switch according to the connectionless address contained in the cells stored in said buffer to establish a connection in said switch and controlling said buffer to forward the stored cells to the established connection.

10. A data communication system as claimed in claim 9, wherein each of said cross-connect nodes further comprises:

means for receiving the cells from said switch and producing an output signal in response to one of the received cells that defines the beginning of a packet;

a counter for incrementing a count value in response to said output signal; and means for writing said count value into a VCI field of each of said cells forwarded from said switch.

11. A data communication system as claimed in claim 9, wherein each of said cross-connect nodes comprises:

a VCI status memory for storing a status indication of each of a plurality of VCIs in a plurality of storage locations;

means for receiving the cells from said switch and producing an output signal in response to one of the received cells that defines the beginning of a packet;

a counter for incrementing a count value in response to said output signal and reading the status indication of one of said VCIs using the count value as an address pointer;

a VCI insertion circuit for inserting a VCI into a VCI field of each of said cells;

means for writing a busy indication into said one of the locations and causing said VCI insertion circuit to insert said count value into said VCI field if the read status indication is an idle indication;

a buffer connected to the output of the VCI insertion circuit for storing a sequence of cells in a queue and forwarding the cells to a communication link; and means for writing an idle indication into said one of the locations in response to one of the cells from said buffer which corresponds to the end of said packet.

12. A data communication system as claimed in claim 9, wherein each of said cross-connect nodes comprises:

a VCI insertion circuit for inserting a VCI into a VCI field of each of said cells;

means for receiving the cells from said switch and producing an output signal in response to one of the received cells that defines the beginning of a packet;

a first-in-first-out (FIFO) memory for storing a plurality of idle VCIs, the FIFO memory being responsive to said output signal for forwarding one of the stored VCIs to said VCI insertion circuit to insert the forwarded VCI into said VCI field;

a buffer connected to the output of the VCI insertion circuit for storing a sequence of cells in a queue and forwarding the cells to one of the cross-connect nodes or one of said interworking units; and means for detecting the VCI of a cell forwarded from said buffer at the end of said packet and storing the detected VCI into the FIFO memory.

13. A data communication system as claimed in claim 1, further comprising an address resolution server connected via said ATM network to said interworking units via said permanent virtual connections, wherein each of said interworking units further comprising:

an address resolution table for mapping said connectionless addresses to destination network addresses; and means for making a search through said address resolution table when a packet is received from one of the local area networks for detecting a connectionless address corresponding to a destination network address contained in the packet and transmitting a request packet to said address resolution server to obtain a reply packet if the corresponding connectionless address is not found in said address resolution table and updating the address resolution table with a connectionless address contained in the reply packet.

14. A data communication system for a plurality of user end systems, the communication system comprising:

an asynchronous transfer mode network having a plurality of connecting points at the periphery of the network, said network comprising:

means for segmenting a packet from said user end systems into a plurality of cells containing a connectionless address designating one of said connecting points, a virtual path identifier (VPI) designating one of a plurality of permanent virtual connections, and a virtual channel identifier (VCI) identifying said packet;

means for routing the cells having VCIs of equal value through a permanent virtual connection designated by the VPI contained in the cells toward a destination connecting point designated by the connectionless address contained in the cells, and rewriting the VPI and VCI of said cells when the cells are routed via a further permanent virtual connection until said destination connecting point is reached; and means for assembling the cells having VCIs of equal value at the destination connecting point into a packet and transmitting the packet to one of the user end systems.

15. A data communication system as claimed in claim 14, wherein said segmenting means comprises:

a counter for incrementing a count value in response to one of said cells that defines the beginning of a packet; and means for writing said count value into the VCI field of each of said cells that comprise said packet.

16. A data communication system as claimed in claim 14, wherein said segmenting means comprises:

a VCI status memory for storing a status indication of each of a plurality of VCIs in a plurality of storage locations;

a counter for incrementing a count value in response to one of said cells that defines the beginning of a packet and reading the status indication of one of said VCIs using the count value as an address pointer;

a VCI insertion circuit for inserting a VCI into a VCI field of each of said cells;

means for writing a busy indication into said one of the locations and causing said VCI insertion circuit to insert said count value into said VCI field if the read status indication is an idle indication;

a buffer connected to the output of the VCI insertion circuit for storing a sequence of cells in a queue; and means for writing an idle indication into said one of the locations in response to one of the cells from said buffer which corresponds to the end of said packet.

17. A data communication system as claimed in claim 14, wherein said segmenting means comprises:

a VCI insertion circuit for inserting a VCI into a VCI field of each of said cells;

a first-in-first-out (FIFO) memory for storing a plurality of idle VCIs, the FIFO memory being responsive to one of said cells that defines the beginning of a packet for forwarding one of the stored VCIs to said VCI insertion circuit to insert the forwarded VCI into said VCI field;

a buffer connected to the output of the VCI insertion circuit for storing a sequence of cells in a queue; and means for detecting the VCI of a cell forwarded from said buffer at the end of said packet and storing the detected VCI into the FIFO memory.

18. A data communication system as claimed in claim 14, wherein said assembling means comprises:

a VCI status table for storing a status indication of each of a plurality of VCIs in a plurality of storage locations;

means for receiving cells and detecting the VCI contained in each of the cells, reading status indication from one of said locations of the table corresponding to the detected VCI, writing a busy indication into said one of the locations and recognizing a received cell as the beginning of a packet if the read status indication is an idle indication, and writing an idle indication into said one of the locations in response to a received cell corresponding to the end of said packet;

a buffer; and means for storing the received cells into said buffer so that the cells having VCIs of equal value are assembled in a queue.

19. A data communication system as claimed in claim 14, wherein said routing means comprises:

a VCI status table for storing a status indication of each of a plurality of VCIs in a plurality of storage locations;

means for detecting the VCI contained in each of the cells received via one of said links, reading a status indication from one of said locations of the table corresponding to the detected VCI, writing a busy indication into said one of the locations and recognizing a cell from the ATM network as the beginning of said packet if the read status indication is an idle indication, and writing an idle indication into said one of the locations in response to a cell received via said one of said permanent virtual connections corresponding to the end of said packet;

a buffer for storing cells received via said one of said permanent virtual connections;

a switch; and means for controlling said switch according to the connectionless address contained in the cells stored in said buffer to establish a connection in said switch and controlling said buffer to forward the stored cells to the established connection.

20. A data communication method for a network which includes a plurality of connecting points at the periphery thereof, comprising:

segmenting a packet from a source user end system into a plurality of cells containing a connectionless address designating one of said connecting points, a virtual path identifier (VPI) designating one of a plurality of permanent virtual connections, and a virtual channel identifier (VCI) identifying said packet;

routing the cells having VCIs of equal value through a permanent virtual connection designated by the VPI contained in the cells toward a destination connecting point designated by the connectionless address contained in the cells;

rewriting the VPI and VCI of said cells when the cells are routed via a further permanent virtual connection until said destination connecting point is reached;

assembling the cells having VCIs of equal value at the destination connecting point into a packet; and transmitting the packet to a destination user end system.

* * * * *